US012519283B2

(12) United States Patent
Matsubara et al.

(10) Patent No.: US 12,519,283 B2
(45) Date of Patent: Jan. 6, 2026

(54) SEMICONDUCTOR OPTICAL DEVICE AND METHOD OF MANUFACTURING SEMICONDUCTOR OPTICAL DEVICE

(71) Applicant: FURUKAWA ELECTRIC CO., LTD., Tokyo (JP)

(72) Inventors: Noritaka Matsubara, Tokyo (JP); Junichi Hasegawa, Tokyo (JP); Etsuji Katayama, Tokyo (JP); Tatsuro Kurobe, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 415 days.

(21) Appl. No.: 17/884,875

(22) Filed: Aug. 10, 2022

(65) Prior Publication Data
US 2023/0035065 A1 Feb. 2, 2023

Related U.S. Application Data

(63) Continuation of application No. PCT/JP2021/004669, filed on Feb. 8, 2021.
(Continued)

(51) Int. Cl.
*H01S 5/023* (2021.01)
*G02B 6/12* (2006.01)
(Continued)

(52) U.S. Cl.
CPC .............. *H01S 5/023* (2021.01); *G02B 6/12* (2013.01); *H01S 5/02326* (2021.01); *H01S 5/02375* (2021.01); *G02B 2006/12121* (2013.01)

(58) Field of Classification Search
CPC ........ G02B 6/423; G02B 6/42; G02B 6/4201; G02B 6/4219; G02B 6/4226; G02B 6/4224; G02B 6/426; H01S 5/023; H01S 5/02326
See application file for complete search history.

(56) References Cited

U.S. PATENT DOCUMENTS 5,621,837 A 4/1997 Yamada et al.
6,324,314 B1 11/2001 Ukechi et al.
(Continued)

FOREIGN PATENT DOCUMENTS

CN 106098901 A 11/2016
JP 08-078657 A 3/1996
(Continued)

OTHER PUBLICATIONS

Japanese Office Action issued Nov. 26, 2024 in Japanese Patent Application No. 2022-500407 (with unedited computer-generated English translation). 16 pages.
(Continued)

*Primary Examiner* — Thomas A Hollweg
*Assistant Examiner* — Kirsten D. Endresen
(74) *Attorney, Agent, or Firm* — Oblon, McClelland, Maier & Neustadt, L.L.P.

(57) ABSTRACT

A semiconductor optical device includes: a base configured to intersect with a first direction; a first protrusion configured to protrude from the base in the first direction, the first protrusion including a planar lightwave circuit including: a core layer; and a cladding layer surrounding the core layer; a second protrusion configured to protrude from the base in the first direction and arranged along the first protrusion in a second direction intersecting with the first direction, a height of the second protrusion from the base in the first direction being lower than a height of the first protrusion; an
(Continued)

optical semiconductor element placed on a facet of the second protrusion in the first direction and optically connected to the core layer; and a marker provided on the second protrusion in a manner exposed on the facet, the marker being made of a same material as the core layer.

14 Claims, 14 Drawing Sheets

Related U.S. Application Data

(60) Provisional application No. 62/976,782, filed on Feb. 14, 2020.

(51) Int. Cl.
*H01S 5/02326* (2021.01)
*H01S 5/02375* (2021.01)

(56) References Cited

U.S. PATENT DOCUMENTS

| | | | |
|---|---|---|---|
| 6,445,837 | B1 | 9/2002 | Hatami Hanza |
| 2004/0051872 | A1 | 3/2004 | Blidegn |
| 2017/0244216 | A1* | 8/2017 | Hemenway .......... H01S 5/02345 |
| 2019/0033127 | A1* | 1/2019 | Kim ....................... G02B 6/423 |

FOREIGN PATENT DOCUMENTS

| | | |
|---|---|---|
| JP | 2000-098157 A | 4/2000 |
| JP | 2007-264470 A | 10/2007 |
| JP | 2008-241732 A | 10/2008 |
| JP | 2020-13158 A | 1/2020 |
| KR | 100835080 B1 * | 6/2008 |
| WO | WO-2015111600 A1 * | 7/2015 ............. G02B 6/423 |

OTHER PUBLICATIONS

International Search Report issued Apr. 6, 2021 in PCT/JP2021/004669 filed on Feb. 8, 2021, 2 pages.

Shimizu et al., "Multichannel and high-density hybrid integrated light source with a laser diode array on a silicon optical waveguide platform for interchip optical interconnection", Photon. Res., vol. 2, No. 3, Jun. 2014, 6 pages.

Combined Chinese Office Action and Search Report issued Mar. 22, 2025 in Chinese Patent Application No. 202180013696.X (with unedited computer-generated English translation of Office Action only), 15 pages.

* cited by examiner

SEMICONDUCTOR OPTICAL DEVICE AND METHOD OF MANUFACTURING SEMICONDUCTOR OPTICAL DEVICE

This application is a continuation of International Application No. PCT/JP2021/004669, filed on Feb. 8, 2021 which claims the benefit of priority of the U.S. Provisional Patent Application No. 62/976,782, filed on Feb. 14, 2020, the entire contents of which are incorporated herein by reference.

BACKGROUND

The present disclosure relates to a semiconductor optical device and a method of manufacturing a semiconductor optical device.

In the related art, having been known is a semiconductor optical device including a planar lightwave circuit formed on a silicon substrate, and a laser element mounted at a predetermined position on a submount including the silicon substrate and the planar lightwave circuit (Japanese Patent Application Laid-open No. 2007-264470). According to Japanese Patent Application Laid-open No. 2007-264470, an alignment marker is formed on the submount so as to enable the submount and the laser element to be positioned.

SUMMARY

The above-described alignment markers are often achieved by forming a metal layer on the surface of the submount, and removing the metal layer in such a manner that the remaining metal delineates the shape of the alignment marker. In such a case, if the position of the alignment marker with respect to the core layer of the planar lightwave circuit is less accurate, the positioning accuracy between the laser element and the planar lightwave circuit also becomes less accurate.

There is a need for a semiconductor optical device having an improved and novel configuration capable of improving the accuracy of the positioning of an optical semiconductor element, and a method of manufacturing such a semiconductor optical device, for example.

According to one aspect of the present disclosure, there is provided a semiconductor optical device including: a base configured to intersect with a first direction; a first protrusion configured to protrude from the base in the first direction, the first protrusion including a planar lightwave circuit including: a core layer; and a cladding layer surrounding the core layer; a second protrusion configured to protrude from the base in the first direction and arranged along the first protrusion in a second direction intersecting with the first direction, a height of the second protrusion from the base in the first direction being lower than a height of the first protrusion; an optical semiconductor element placed on a facet of the second protrusion in the first direction and optically connected to the core layer; and a marker provided on the second protrusion in a manner exposed on the facet, the marker being made of a same material as the core layer.

DETAILED DESCRIPTION

Figure 1:
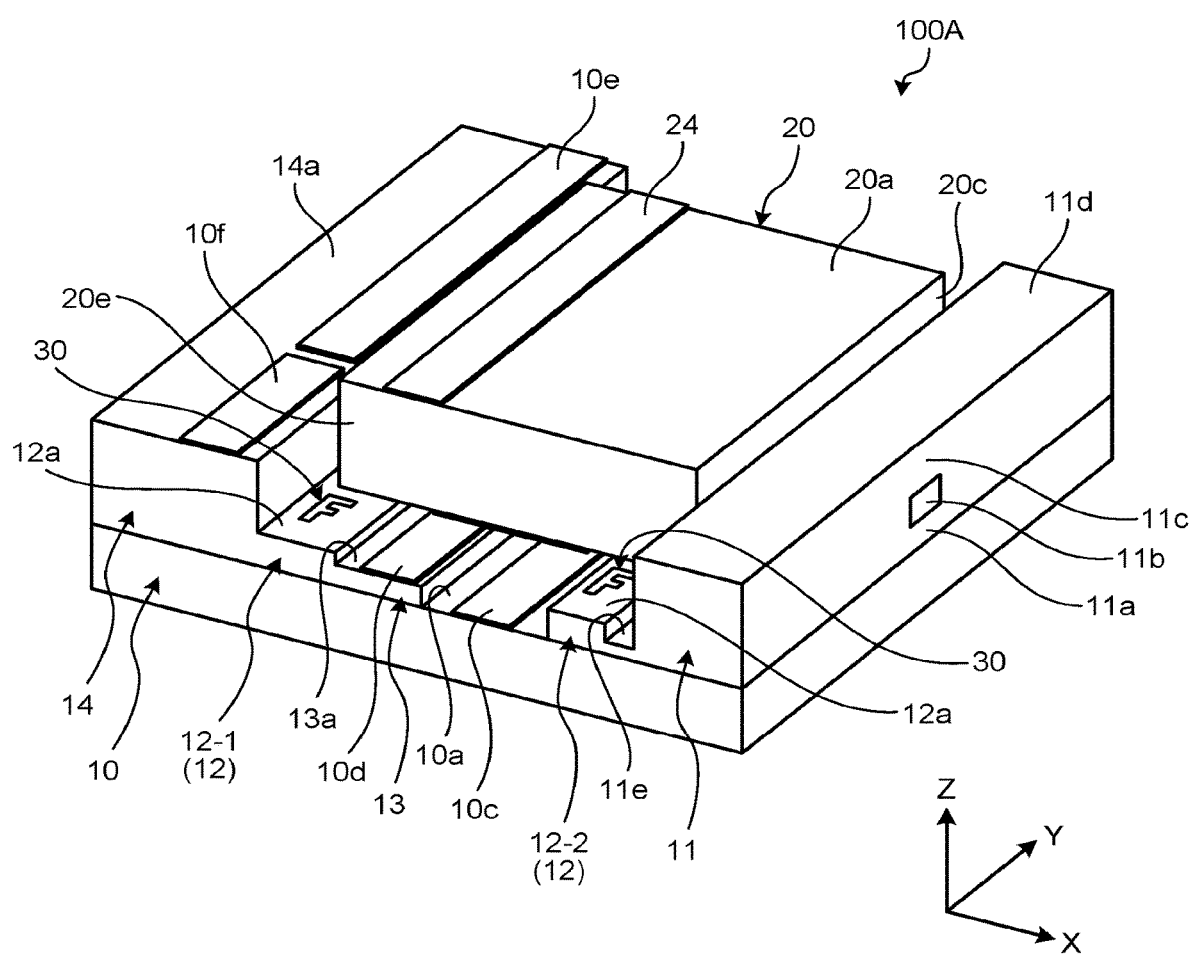
FIG. 1 is an exemplary and schematic perspective view of a semiconductor optical device according to a first embodiment.

Some exemplary embodiments of the present disclosure will now be explained. Configurations disclosed in the following embodiments as well as actions and results (effects) brought about by the configurations are exemplary. The present disclosure may also be implemented in configurations other than those disclosed in the following embodiments. Furthermore, according to the present disclosure, it is possible to achieve at least one of various effects (including derivative effects) achieved by these configurations.

Similar configurations are included in the embodiments explained below. Therefore, with the configurations according to these embodiments, it is possible to achieve similar actions and effects based on the similar configurations. In the following explanations, such similar configurations will be given similar reference numerals, and redundant explanations thereof may be omitted.

In the description herein, ordinal numbers are assigned for the convenience of distinguishing parts, directions, or the like, and are not intended to indicate any priorities or orders.

In the drawings, an X direction is represented by an arrow X. A Y direction is represented by an arrow Y, and a Z direction is represented by an arrow Z. The X, Y, and Z directions intersect one another, and are orthogonal to one another.

First Embodiment

Figure 2:
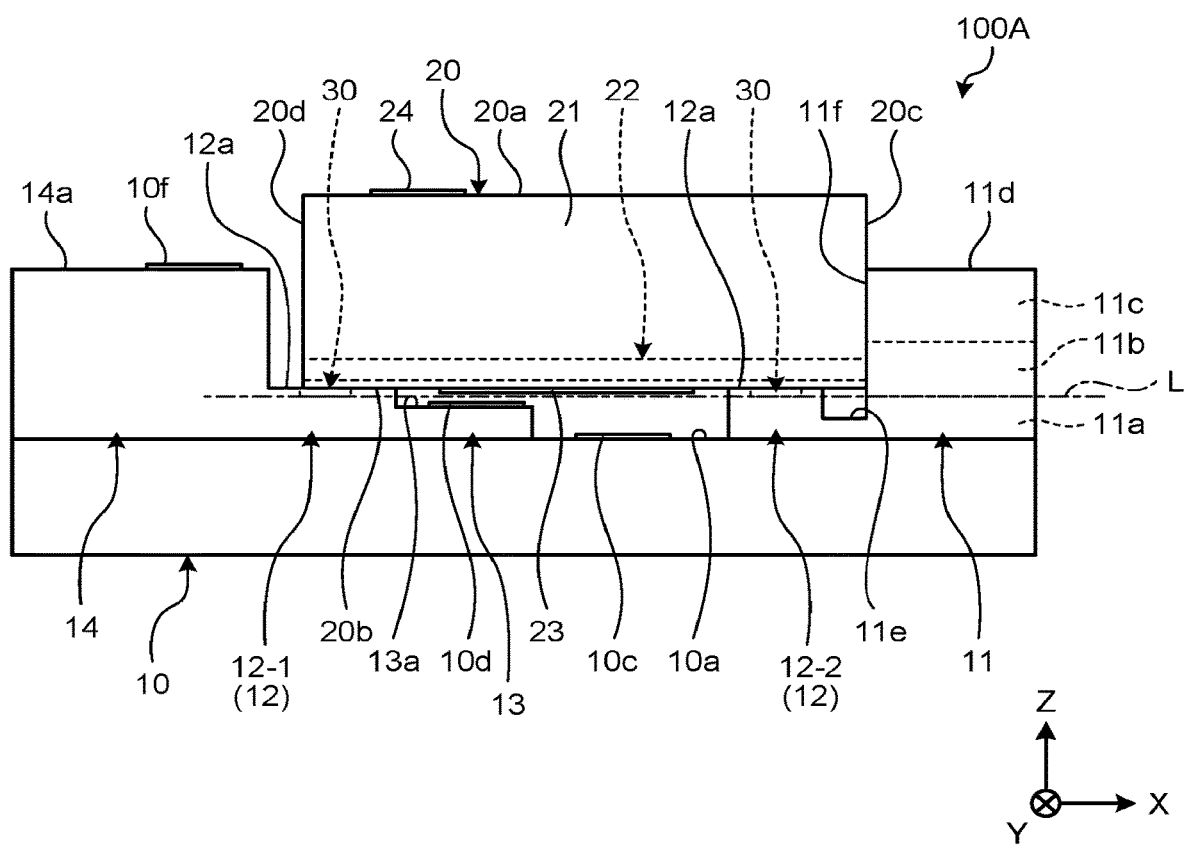
FIG. 2 is an exemplary and schematic side view of the semiconductor optical device according to the first embodiment.
Figure 3:
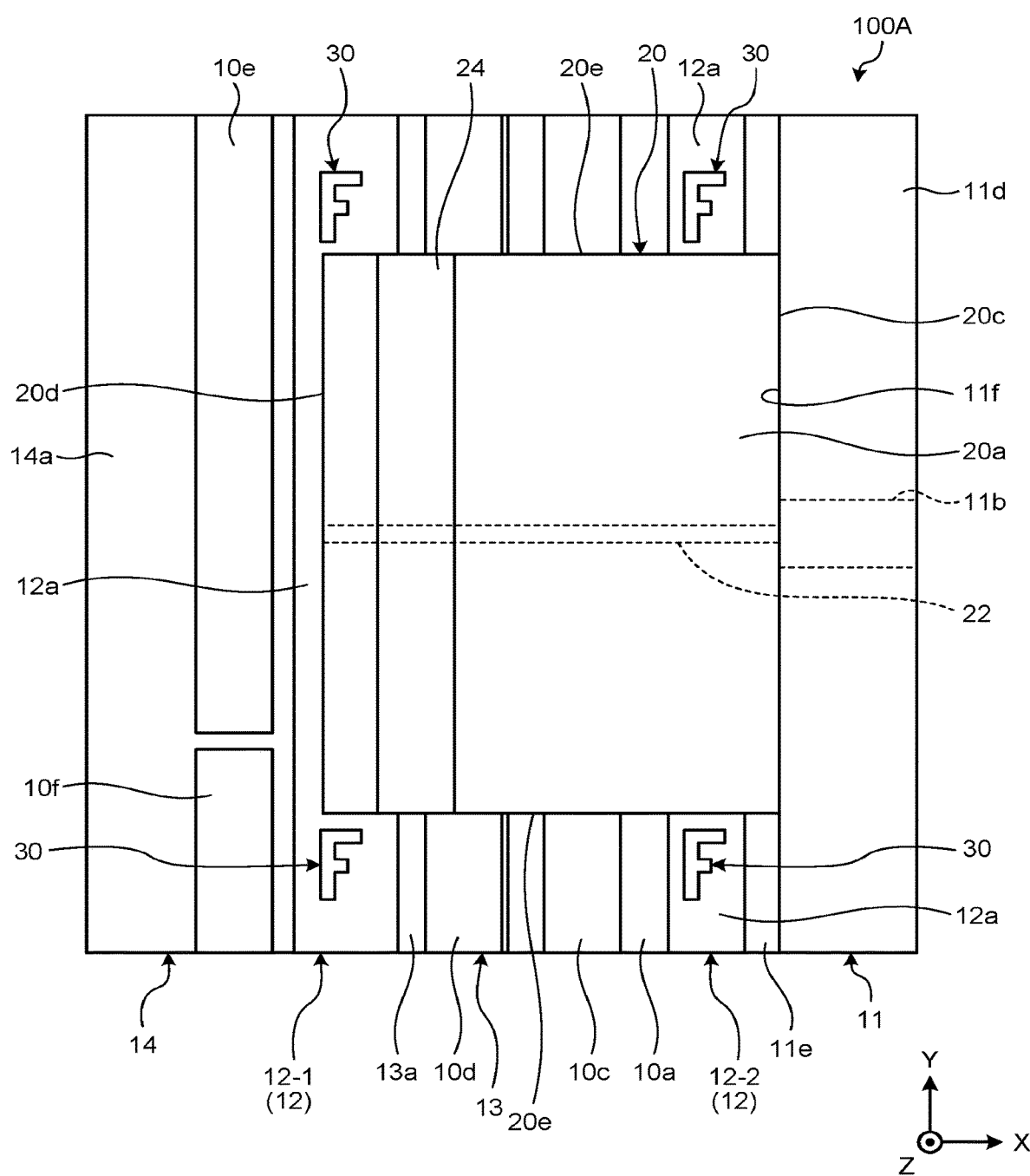
FIG. 3 is an exemplary and schematic plan view of the semiconductor optical device according to the first embodiment.

FIG. 1 is a perspective view of a semiconductor optical device 100A according to the first embodiment. FIG. 2 is a side view of the semiconductor optical device 100A, and FIG. 3 is a plan view of the semiconductor optical device 100A.

The semiconductor optical device 100A includes a base 10, a first protrusion 11, two second protrusions 12 (12-1, 12-2), a third protrusion 13, a fourth protrusion 14, and a light-emitting element 20.

The base 10 is made from a silicon substrate. The base 10 intersects with and orthogonal to the Z direction, and extends in the X and Y directions. The base 10 has a front surface 10a and a rear surface 10b. The front surface 10a is a facet in the Z direction. The front surface 10a faces the Z direction, intersects with and is orthogonal to the Z direction, and extends in the X and Y directions. The rear surface 10b is positioned on the opposite side of the front surface 10a in the Z direction, and is a facet in the direction opposite to the Z direction. The rear surface 10b faces the direction opposite to the Z direction, intersects with and orthogonal to the Z direction, and extends in the X and Y directions. The Z direction is an example of a first direction.

The first protrusion 11 protrudes from the front surface 10a of the base 10 in the Z direction. As illustrated in FIGS. 1 and 2, the first protrusion 11 forms a planar lightwave circuit (PLC) in which a first cladding layer 11a, a core layer 11b, and a second cladding layer 11c are laminated in the order listed herein in the Z direction. The core layer 11b extends in the X direction at an approximately constant height in the Z direction and an approximately constant width in the Y direction. A sectional shape of the core layer 11b in a direction intersecting with the X direction is rectangular. The core layer 11b may also be referred to as a waveguide layer. Parts of the core layer 11b on both sides in the Y direction and in the direction opposite thereto are embedded in the first cladding layer 11a, and the first cladding layer 11a surrounds the core layer 11b together with the second cladding layer 11c, as a cladding layer.

The first cladding layer 11a and the second cladding layer 11c are made of a quartz glass material, for example. The core layer 11b is made of a quartz glass material having a refractive index higher than those of the first cladding layer 11a and the second cladding layer 11c, for example. The core layer 11b may be made of, for example, a quartz glass containing germania ($GeO_2$) or zirconia ($ZrO_2$), as a dopant for increasing the refractive index. The relative refractive-index difference between the core layer 11b, and the first cladding layer 11a and the second cladding layer 11c may be set appropriately within a range of 0.1[%] to 10[%]. The width of the core layer 11b in the Y direction may be set to 0.5 [μm] to 5 [μm] and the height in the Z direction may be set to 0.5 [μm] to 5 [μm]. As an example, when the relative refractive-index difference is 0.45[%], the sectional size of the core layer 11b in the Y and Z directions are preferably 3 [μm]×3 [μm].

The two second protrusions 12 (12-1, 12-2) both protrude in the Z direction from the front surface 10a of the base 10. The two second protrusions 12 have the same height from the front surface 10a of the base 10 in the Z direction, and are lower than the height by which the first protrusion 11 protrudes in the Z direction.

The two second protrusions 12-1, 12-2 are separated from each other in the X direction. The second protrusion 12-1 is positioned on the opposite side of the first protrusion 11 with respect to the second protrusion 12-2. The two second protrusions 12-1, 12-2 are arranged along the first protrusion 11 in the X direction.

The second protrusions 12 serve as a seat on which the light-emitting element 20 is placed. Facets 12a of the second protrusions 12 in the direction opposite to the Z direction face the Z direction, intersect with and are orthogonal to the Z direction, and extend in the X and Y directions. The second protrusions 12 are an example of a support, and may also be referred to as a placing part. The facets 12a may also be referred to as a support surface or a mounting surface for the light-emitting element 20.

The two second protrusions 12-1, 12-2 support both sides of the light-emitting element 20, both sides being the front side and the rear side in the X direction, being the front and the rear with respect to the center in the X direction. The second protrusion 12-1 supports an end of the light-emitting element 20 in the direction opposite to the X direction, and the second protrusion 12-2 supports an end of the light-emitting element 20 in the X direction.

The second protrusions 12-1 and 12-2 both extend in the Y direction, and support both sides of the light-emitting element 20, both sides being the front side and the rear side in the Y direction, being front and the rear with respect to the center of the light-emitting element 20 in the Y direction. However, without limitation thereto, the second protrusions 12 may be separated from each other in the Y direction, and the second protrusions 12 separated in the Y direction may be configured to support the light-emitting element 20.

Between the second protrusion 12-2 that is one of two second protrusions 12 positioned closer to the first protrusion 11, and the first protrusion 11, there is a recess 11e recessed in the direction opposite to the Z direction. The bottom surface of the recess 11e may be separated from the front surface 10a of the base 10 in the Z direction, or may be the front surface 10a of the base 10.

The third protrusion 13 protrudes from the front surface 10a of the base 10 in the Z direction. The height of the third protrusion 13 is lower than the heights of the second protrusions 12 from the front surface 10a of the base 10 in the Z direction.

The third protrusion 13 is positioned between the two second protrusions 12-1, 12-2 and is arranged along the first protrusion 11 and the two second protrusions 12-1, 12-2 in the X direction. The third protrusion 13 is positioned adjacently to the second protrusion 12-1 in the X direction, the second protrusion 12-1 being the one of the two second protrusions 12 positioned further away from the first protrusion 11, and is integrated with the second protrusion 12-1. The third protrusion 13 and the second protrusion 12-1 together form a step-like shape the height of which in the Z direction decreases as the step moves toward the X direction.

A facet 13a of the third protrusion 13 in the Z direction faces the Z direction, intersects with and is orthogonal to the Z direction, and extends in the X and Y directions. On the facet 13a, a thin film-like electrode 10d is provided. The electrode 10d is made of a highly conductive material, such as gold. The electrode 10d is an example of a third electrode.

The fourth protrusion 14 protrudes from the front surface 10a of the base 10 in the Z direction. The height of the fourth protrusion 14 from the front surface 10a of the base 10 is higher than the heights of the two second protrusions 12 and the third protrusion 13, and is substantially the same as the height of the first protrusion 11.

The fourth protrusion 14 is arranged along the first protrusion 11, the two second protrusions 12, and the third protrusion 13 in the X direction. The fourth protrusion 14 is positioned on the opposite side of the third protrusion 13 with respect to the second protrusion 12-1, and is positioned on the opposite side of the first protrusion 11 with respect to the light-emitting element 20. In other words, the light-emitting element 20 is positioned between the first protrusion 11 and the fourth protrusion 14 in the X direction.

The fourth protrusion 14 is positioned adjacently to the second protrusion 12-1 in the direction opposite to the X direction, and is integrated with the second protrusion 12-1. The fourth protrusion 14, the second protrusion 12-1, and the third protrusion 13 together form a step-like shape the height of which in the Z direction decreases as the step moves toward the X direction.

A facet 14a of the fourth protrusion 14 in the Z direction faces the Z direction, intersects with and is orthogonal to the Z direction, and extends in the X and Y directions. On the facet 14a, thin film-like electrodes 10e, 10f are provided. The electrodes 10e, 10f are made of a highly conductive material, such as gold. The electrodes 10e, 10f are regions electrically connected to an external wiring (not illustrated), for example, and, from such a viewpoint, the electrodes 10e, 10f may also be referred to as external electrodes. The electrode 10f is an example of a fourth electrode.

The two second protrusions 12, the third protrusion 13, and the fourth protrusion 14 are made of the same material as that of the first cladding layer 11a and the second cladding layer 11c.

On the front surface 10a of the base 10, a thin membrane electrode 10c is provided at a position between the two second protrusions 12 and also between the second protrusion 12-2 and the third protrusion 13. The electrode 10c is made of a highly conductive material, such as gold. The electrode 10c is an example of a second electrode.

The light-emitting element 20 is, for example, a laser diode. The light-emitting element 20 has a substantially rectangular shape. In other words, the light-emitting element 20 has a substantially rectangular shape in a view in the direction opposite to the Z direction.

The light-emitting element 20 is an example of an optical semiconductor element optically connected to the core layer 11b. The optical semiconductor element optically connected to the core layer 11b is not limited to the light-emitting element 20, but may also be a light-receiving element or an optical modulation element. An optical modulation element changes some characteristic of light, by performing spatial modulation, phase modulation, or intensity modulation to the light. The optical semiconductor element may also be an integration of two or more elements selected from a light-emitting element, a light-receiving element, and an optical modulation element.

The light-emitting element 20 has a facet 20a facing the Z direction, a facet 20b facing a direction opposite to the Z direction, a facet 20c facing the X direction, and a facet 20d facing the direction opposite to the X direction. The facets 20a, 20b intersect with and are orthogonal to the Z direction, and extend in the X and Y directions. The facets 20c, 20d intersect with and are orthogonal to the X direction, and extend in the Y and Z directions.

The light-emitting element 20 includes a cladding layer 21 and an active layer 22, as illustrated in FIG. 2. An end of the active layer 22 in the X direction faces the core layer 11b in the first protrusion 11. The light output from the active layer 22 in the X direction is coupled to the core layer 11b. The X direction is an example of a second direction.

The active layer 22 extends in the X direction at a constant width in the Y direction, at the center of the Y direction, as illustrated in FIG. 3. In this embodiment, the active layer 22 is disposed closer to the facet 20b than to the facet 20a, as illustrated in FIG. 2. However, this configuration is merely one example, and the position of the active layer 22 in the Z direction may be changed as appropriate. The position of the active layer 22 in the Z direction is set in such a manner that the active layer 22 faces the core layer 11b in the X direction and the light output from the active layer 22 is coupled to the core layer 11b.

A thin film-like electrode 23 is provided on the facet 20b of the light-emitting element 20 in the direction opposite to the Z direction. A thin film-like electrode 24 is provided on a facet 20a of the light-emitting element 20 in the Z direction. Both of the electrodes 23 and 24 are made of a highly conductive material, such as gold. The electrode 24 is a cathode and the electrode 23 is an anode, for example.

The electrode 24 is electrically connected to the electrode 10e provided on the fourth protrusion 14, via conductor wiring such as a bonding wire (not illustrated).

Figure 4:
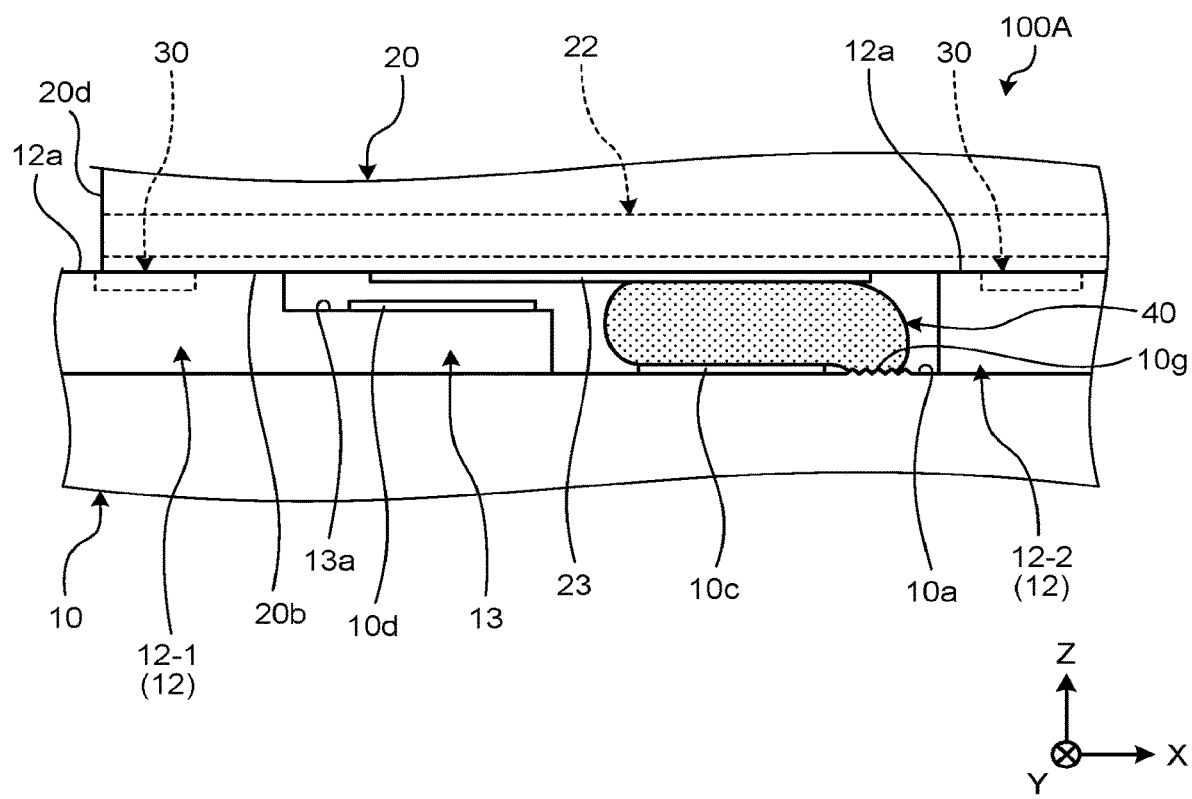
FIG. 4 is an enlarged view of a part of FIG. 2.

FIG. 4 is an enlarged view of a part of FIG. 2. As illustrated in FIG. 4, conductive paste 40 is interposed between the electrode 23 and the electrode 10c disposed on the front surface 10a of the base 10. The electrode 23 and the electrode 10c are electrically connected to each other via the conductive paste 40. The conductive paste 40 is interposed between the electrode 23 and the electrode 10c in a compressed and deformed manner, for example, and is in close contact with both of the electrodes 23 and 10c. The electrode 10c is electrically connected to the electrode 10f via conductor wiring, such as a bonding wire (not illustrated). Thus, the electrode 23 is electrically connected to the electrode 10f provided on the fourth protrusion 14 via the conductive paste 40, the electrode 10c, and the conductor wiring. This configuration having the conductive paste 40 has the advantage that, for example, it is relatively easy to provide the conductor wiring between the electrode 23 and the electrode 10f provided on the facet 20b of the light-emitting element 20, the facet 20b facing the base 10. The conductive paste 40 is an example of the conductor. The electrode 23 is an example of a first electrode. The electrodes 10c and 10f may be electrically connected via conductor wiring such as a bonding wire (not illustrated) by being relayed by the electrode 10d. In such a configuration, because the length of the conductor wiring may be reduced, it is possible to achieve advantages such as an improvement in the wiring workability and a reduction in the likeliness of the conductor wiring being damaged.

The conductive paste 40 may contain thermally conductive filler. In such a configuration, the conductive paste 40 also functions as a heat conducting member. Thermally conductive filler is particles, powders, nano-particles, or the like made of a metallic material that is both electrically and thermally conductive, such as gold or a silver-based metal. Examples of the silver-based metal include silver and a silver alloy. The conductive paste 40 may be, for example, silver paste containing silver particles, as the thermally conductive filler. With such a configuration, it is possible to achieve an advantage that the heat generated in the light-emitting element 20 may be released to the base 10 via the conductive paste 40, so that it becomes easier to suppress an excessive temperature rise of the light-emitting element 20, for example.

As illustrated in FIG. 4, an area of the front surface 10a of the base 10, the area being that outside of the electrode 10c, is provided with a rough surface 10g having a surface roughness larger than that of the other area of the front surface 10a, and a part of the conductive paste 40 is brought into contact with the rough surface 10g. Because the rough surface 10g has a surface area larger than the other part of the front surface 10a, it is possible to increase the area of the base 10 (rough surface 10g, front surface 10a) to which the conductive paste 40 is brought into contact, compared with when the conductive paste 40 is brought into contact with the other part, and therefore, the amount of heat transferred from the conductive paste 40 to the base 10 may be increased. Hence, such a configuration has the advantage that a larger amount of the heat generated in the light-emitting element 20 may be transferred to the base 10 via the conductive paste 40, so that it becomes easier to further suppress an excessive temperature rise of the light-emitting element 20.

Figure 5:
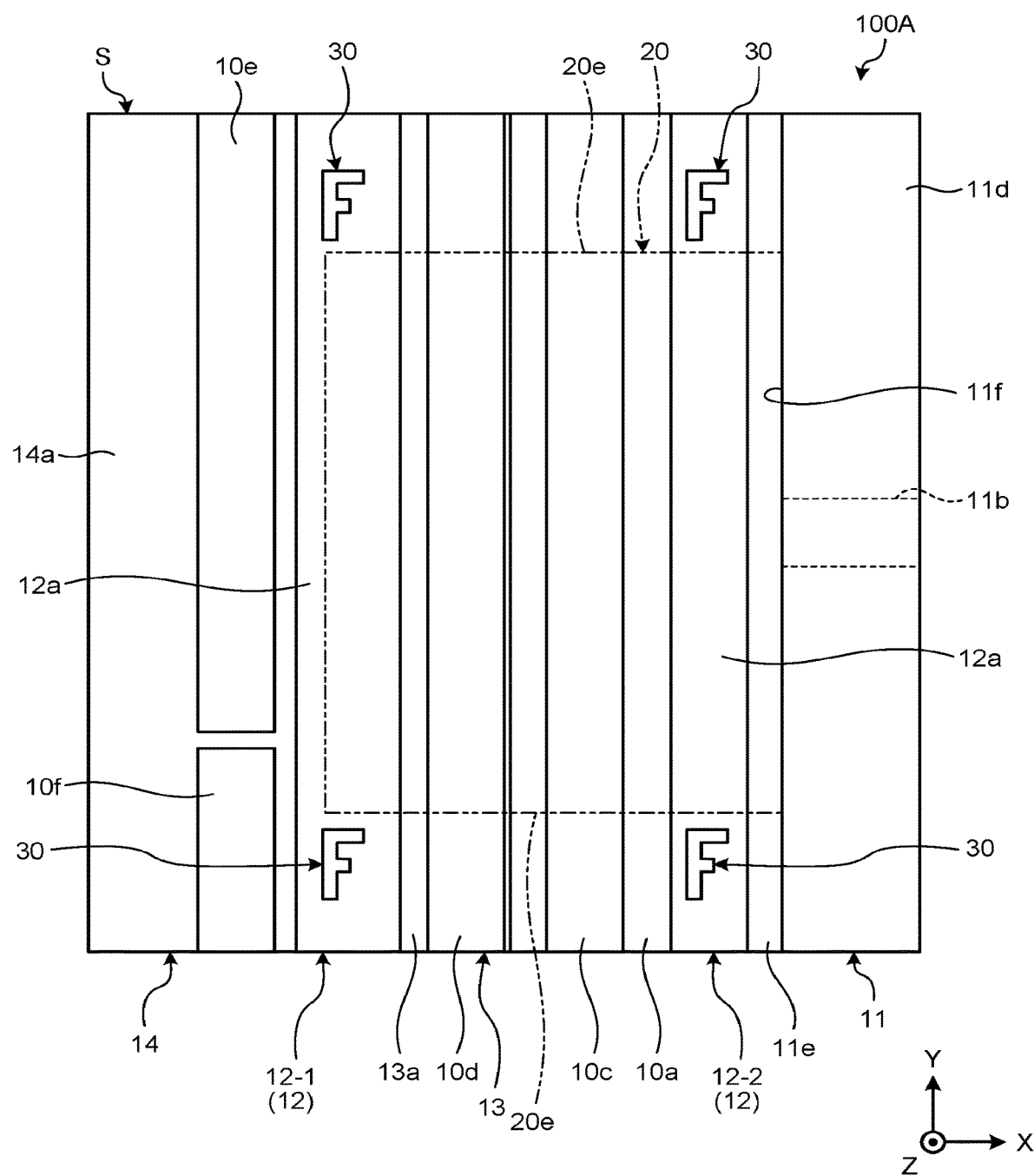
FIG. 5 is an exemplary and schematic plan view of a part of the semiconductor optical device according to the first embodiment, with the light-emitting element removed.

FIG. 5 is a plan view of a part of the semiconductor optical device 100A with the light-emitting element 20 removed. This part may also be referred to as a submount S.

As illustrated in FIG. 5, four markers 30 are provided on the facets 12a of the two second protrusions 12, in a manner at least partially exposed to the facets 12a. When a worker or a robot places the light-emitting element 20 on the facet 12a, the markers 30 serve as a target or a reference either for allowing the worker to visually check the position where the light-emitting element 20 is to be placed, or for allowing the robot to determine such a placement position by performing image processing to an image captured with a camera. These markers 30 are also referred to as alignment markers.

As illustrated in FIG. 5, in this embodiment, a plurality of markers 30, four markers 30 in this embodiment as an example, are provided on the facets 12a, and the light-emitting element 20 is positioned with respect to the second protrusions 12, using these four markers 30 as a reference. Specifically, the light-emitting element 20 is placed in such a manner that a facet 20e in the Y direction or in the direction opposite to the Y direction is positioned adjacently to the corresponding markers 30, in a view in the direction opposite to the Z direction. The facet 20e is an example of an edge.

In this embodiment, in a view in the direction opposite to the Z direction, at the predetermined placement position of the light-emitting element 20, a gap is formed with approximately the same distance between each of the two markers 30 arranged on the second protrusion 12-1 in the Y direction and the facet 20e of the light-emitting element 20, and the light-emitting element 20 is positioned at the center between these two markers 30. In this embodiment, at the predetermined placement position, a gap is formed with approximately the same distance between each of the two markers 30 arranged on the second protrusion 12-2 in the Y direction and the facet 20e of the light-emitting element 20, and the light-emitting element 20 is positioned at the center between these two markers 30. In other words, in this embodiment, in a view in the direction opposite to the Z direction, each of the markers 30 is positioned adjacently to the corresponding facet 20e of the light-emitting element 20, with the gap therebetween. The markers 30 are an example of a first marker, and also an example of a second marker.

It is, however, not essential for a gap to be provided between the markers 30 and the facet 20e at a given placement position in a view in the direction opposite to the Z direction. For example, the edges of the markers 30 may overlap exactly with the facets 20e, or the markers 30 may partially overlap with the light-emitting element 20. Even in these configurations, a part of each of the markers 30 will be positioned adjacently to the corresponding facet 20e, in a view in the direction opposite to the Z direction. In the configuration in which the markers 30 partially overlap with the light-emitting element 20, some marking, such as a scale, may be provided to the markers 30.

In this embodiment, the markers 30 are made of the same material as that of the core layer 11b. A method for manufacturing the semiconductor optical device 100A including the markers 30 will now be explained.

Process of Manufacturing Semiconductor Optical Device

Figure 6:
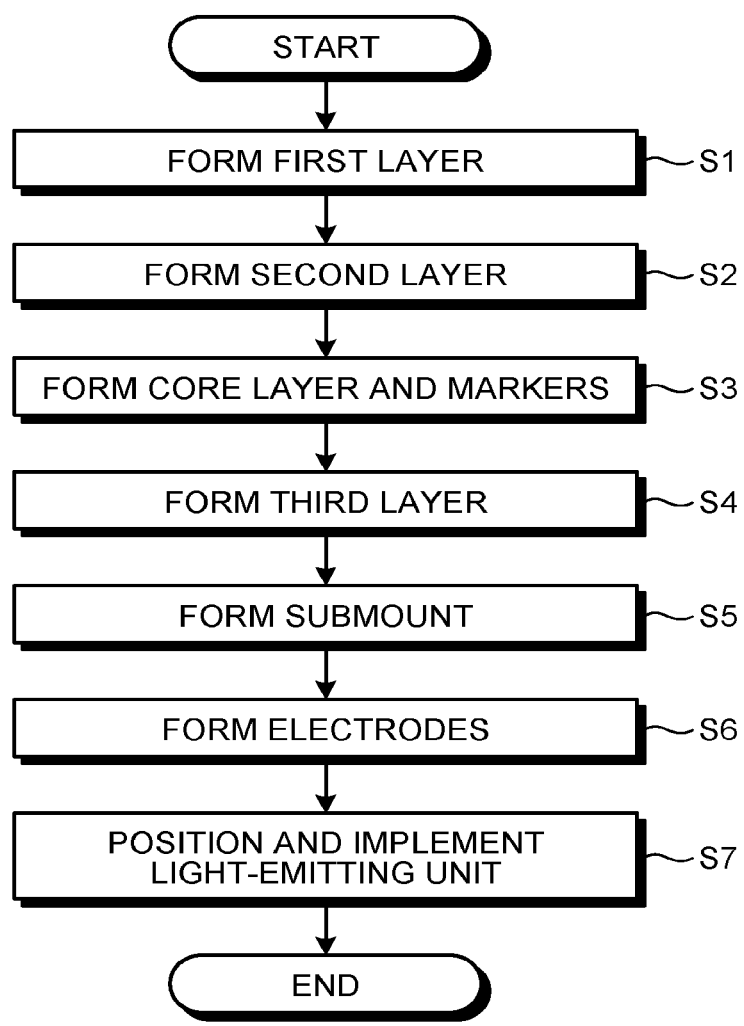
FIG. 6 is a flowchart illustrating an example of a method for manufacturing the semiconductor optical device according to the first embodiment.

FIG. 6 is a flowchart illustrating the manufacturing method of semiconductor optical device 100A. As illustrated in FIG. 6, to begin with, for example, quartz glass particles are deposited on the base 10 in the Z direction using flame hydrolysis deposition (FHD), and then heated to turn the glass particles into transparent glass, to form a first layer including the part that is to become the first cladding layer 11a (S1).

Sputtering, for example, is performed so that a quartz glass particulate layer becomes deposited on the first layer in the Z direction, to form a second layer including the core layer 11b and the part that is to be the markers 30 (S2). At S2, for example, $ZrO_2$ is added to $SiO_2$ so that the refractive index of the core layer 11b is increased to a level higher than that of the first cladding layer 11a, and that the relative refractive-index difference is brought to 0.45[%].

An etching mask including the patterns of the core layer 11b and the markers 30 is then formed on the second layer using photolithography, and the second layer, having the etching mask formed thereon, is then dry-etched using an etching gas, such as fluorine gas (S3). At this S3, the area exposed outside the etch mask is removed, and as a result, the core layer 11b and the markers 30 are formed, as parts of the second layer covered by the etch mask and having remained unremoved. Thus, the core layer 11b and the marker 30 are made of the same material as that of the second layer. An end of the core layer 11b and an end of the markers 30, both of the ends being ends in the direction opposite to the Z direction, both delineates the boundary between the first layer and the second layer, and are positioned at the same height from the front surface 10a of the base 10 in the Z direction, as indicated by the single-dashed line L in FIG. 2. Therefore, the markers 30 are exposed to the facet 12a, and have a predetermined length (depth) in the direction opposite to the Z direction, from the facet 12a.

Quartz glass particles are then deposited on the lamination with the core layer 11b and the markers 30 formed on the first layer, using the FHD method, for example, and then heated so that the glass particles turn into transparent glass, thus providing a third layer including a portion that is to become the second cladding layer 11c (S4).

An etching mask is then formed on the lamination including the first layer, the core layer 11b, the markers 30, and the third layer, and the lamination is selectively removed by dry etching, for example, so as to form a submount S including the first protrusion 11, the second protrusion 12, the third protrusion 13, the fourth protrusion 14, and the recess 11e on the lamination (S5). At S5, the markers 30 are left unremoved on the second protrusion 12.

The electrodes 10c, 10d, 10e, 10f are then formed on the submount S by sputtering and photolithography, for example (S6).

The light-emitting element 20 is then placed on the second protrusion 12 at a predetermined position corresponding to the markers 30, using the markers 30 as a reference, while visually checking or capturing an image of the markers 30 in the direction opposite to the Z direction, for example, and is implemented on the submount S by bonding (S7). When the conductive paste 40 is to be used, before placing the light-emitting element 20, the conductive paste 40 is placed on the submount S in advance, at the position to be covered by the light-emitting element 20.

As explained above, according to this embodiment, the second protrusion 12 has the markers 30 exposed on the facet 12a and made of the same material as that of the core layer 11b.

When photolithography is used in forming the markers as a metal layer, as practiced in the related art, the positioning of the core layer 11b and the markers becomes less accurate, because the positions of the core layer 11b and the markers are determined by different mask patterns. In this respect, according to this embodiment, because the core layer 11b and the markers 30 are made of the same material, a single mask pattern determines the relative positions of the core layer 11b and the markers 30. Therefore, according to this embodiment, it is possible to improve the positioning accuracy of the core layer 11b and the markers 30, and in turn, to improve the positioning accuracy of the core layer 11b and the light-emitting element 20.

In this embodiment, the end of the core layer 11b and the ends of the markers 30, all of the ends being those in the direction opposite to the Z direction, are at the same height in the Z direction (first direction) from the front surface 10a of the base 10.

This feature is a proof that the core layer 11b and the markers 30 are created from the same second layer having been formed on the first layer, at Steps S2 and S3 described above. In addition, according to this embodiment, compared with a configuration in which the markers are made of a metal layer, for example, it is possible to reduce variations in the positions and the thicknesses of the individual markers 30 in the Z direction, and therefore, it is possible to achieve an advantage that the markers 30 may be left unetched more reliably in the etching process.

The markers 30 (first markers) and the facet 20e (edges) of the light-emitting element 20 may be positioned adjacently to each other with a gap therebetween in a view in the direction opposite to the Z direction, as disclosed in this embodiment, or the light-emitting element 20 may be positioned between the two markers 30 (second markers).

With this configuration, it is possible to implement the markers 30 in a relatively simple structure.

Second Embodiment

Figure 7:
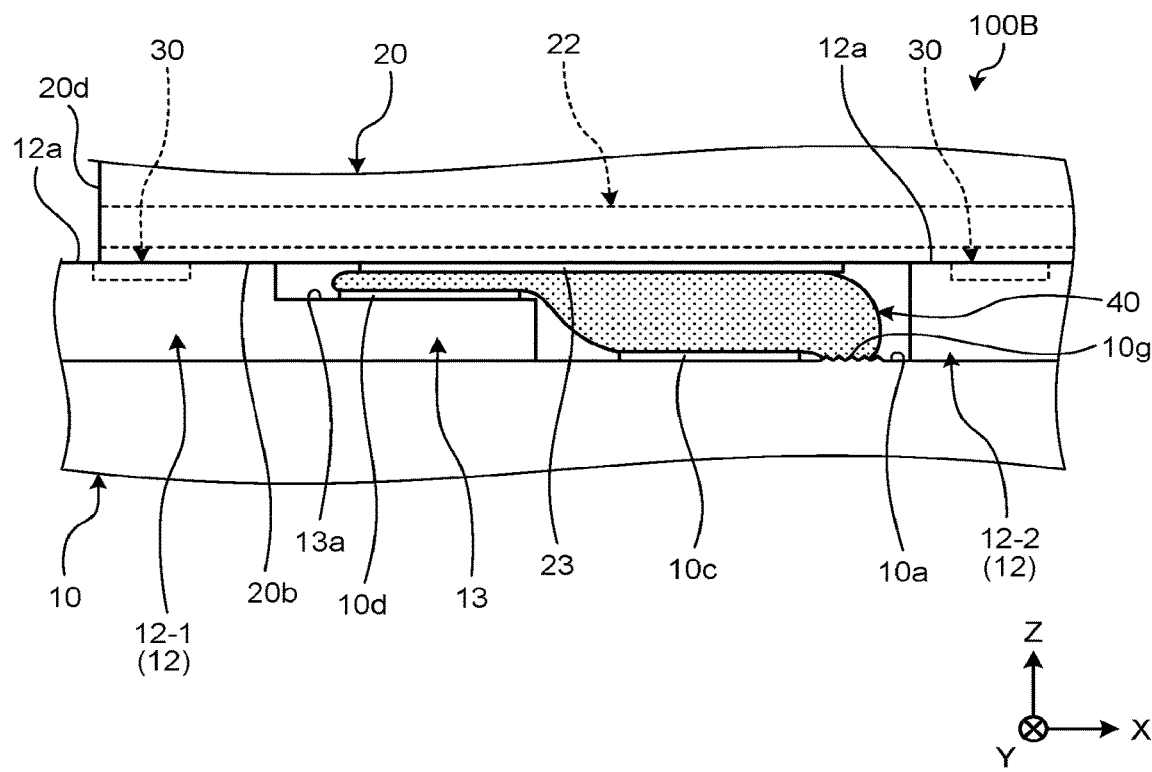
FIG. 7 is an exemplary and schematic side view of a part equivalent to the part illustrated in FIG. 4, in a semiconductor optical device according to a second embodiment.

FIG. 7 is a side view of an equivalent part of semiconductor optical device 100B according to a second embodiment, being equivalent to the part illustrated in FIG. 4.

As illustrated in FIG. 7, in this embodiment, the conductive paste 40 is positioned among the rough surface 10g on the front surface 10a of the base 10, the electrode 10c on the front surface 10a, and the electrode 10d on the facet 13a of the third protrusion 13, and the electrode 23 on the facet 20b of the light-emitting element 20. In this manner, it is also possible to provide the conductive paste 40 to electrically connect the electrode 23 to both of the electrodes 10c and 10d. It is possible to choose, as appropriate, as to whether to use the configuration disclosed the first embodiment (FIG. 4) or that disclosed in this embodiment. Furthermore, in the configuration illustrated in FIG. 7, the electrodes 10d and 10f may be electrically connected via conductor wiring such as a bonding wire (not illustrated). In such a configuration, because the length and the amount of the conductor wiring may be reduced, it is possible to achieve advantages such as a further improvement in the wiring workability and a further reduction of the likeliness of the conductor wiring being damaged.

Third Embodiment

Figure 8:
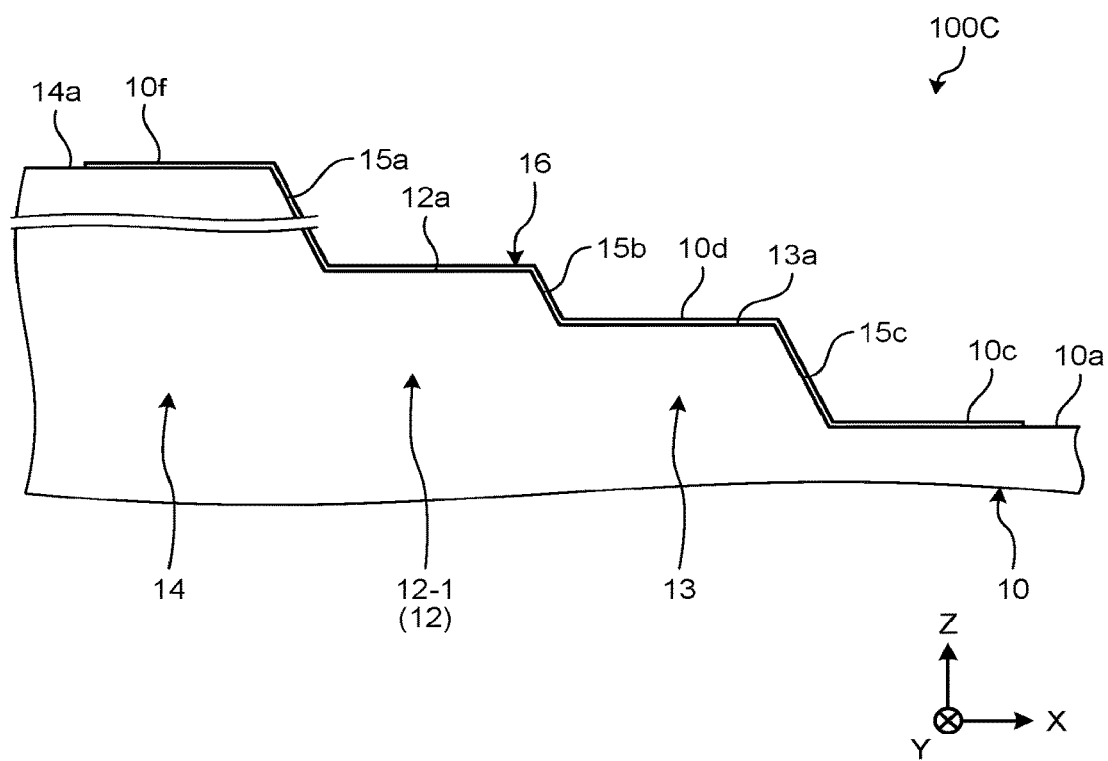
FIG. 8 is an exemplary and schematic side view of a part of the semiconductor optical device according to a third embodiment.

FIG. 8 is a side view of a part of a semiconductor optical device 100C according to a third embodiment. As illustrated in FIG. 8, in this embodiment, a side surface 15a between the fourth protrusion 14 and the second protrusion 12-1, a side surface 15b between the second protrusion 12-1 and the third protrusion 13, and a side surface 15c between the third protrusion 13 and the base 10, all of such side surfaces facing the X direction, are configured as inclined surfaces moving toward the Z direction as these side surfaces become extended in the direction opposite to the X direction. A step structure including the side surfaces 15a to 15c is provided at a position offset in the Y direction with respect to the markers 30, for example, and is provided at a position offset on the opposite side of the markers 30 with respect to the light-emitting element 20, being offset in the Y direction or the direction opposite to the Y direction, in a view in the direction opposite to the Z direction. The side surface 15b is an example of a first inclined surface, and the side surface 15a is an example of a second inclined surface.

A wiring pattern 16 is then provided across the facet 14a, the side surface 15a, the facet 12a, the side surface 15b, the facet 13a, the side surface 15c, and the front surface 10a, extending along these surfaces by an approximately constant width in the Y direction. The wiring pattern 16 electrically connects the electrodes 10f, 10d, and 10c. The wiring pattern 16 is made of a highly conductive material, such as gold, for example, in the same manner as the electrodes 10c, 10d, and 10f.

With this configuration, the electrodes 10c, 10d, 10f may be electrically connected by the wiring pattern 16 formed on the submount S, without the use of wire bonding. With the wiring pattern 16 and the conductive paste 40, it is possible to implement wiring electrically connecting the electrode 23 that is the anode of the light-emitting element 20 and the electrode 10f that is an external electrode, using a relatively simple structure. In addition, because the side surfaces 15a, 15b, 15c become inclined toward the Z direction as these side surfaces become extended in the direction opposite to the X direction, it is possible to achieve advantages such as making it easier to form the wiring pattern 16, a reduction in the length of the wiring pattern 16, and a reduction in the electrical resistance, compared with a configuration in which the side surfaces 15a, 15b, 15c extend in the Z direction and are not inclined toward the Z direction.

Fourth Embodiment

Figure 9:
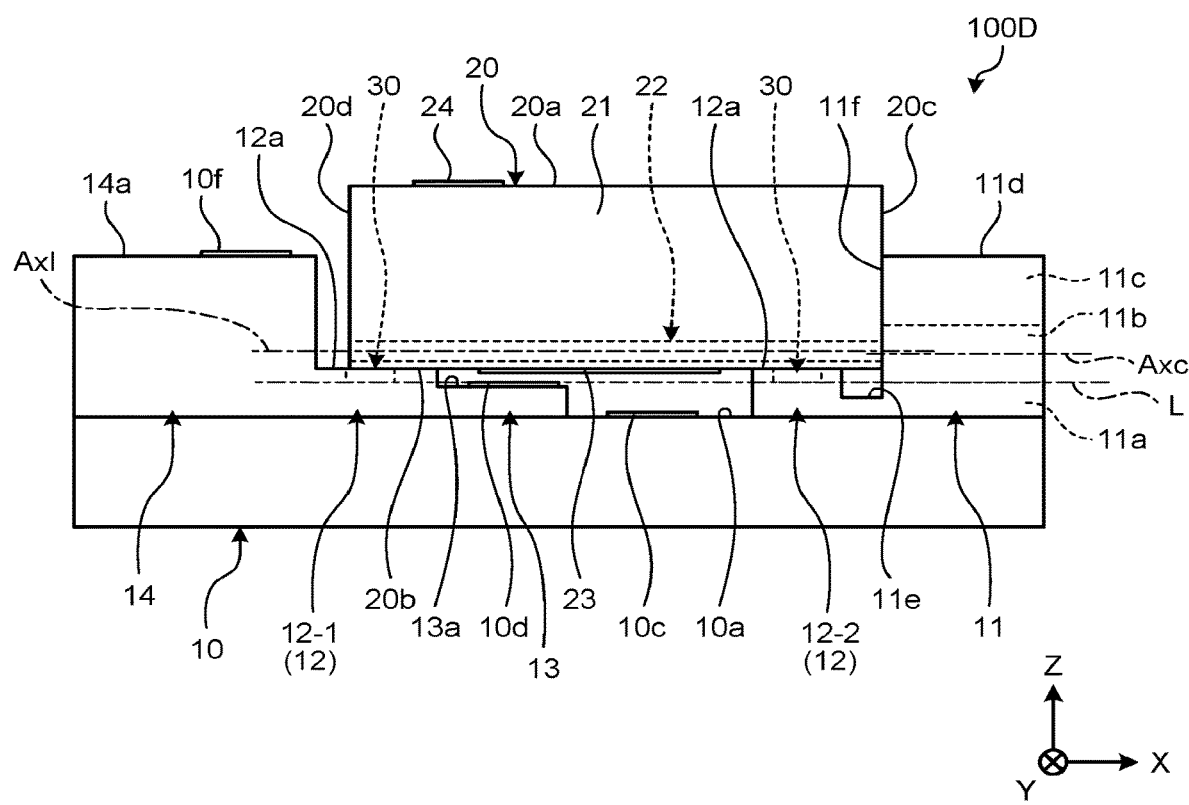
FIG. 9 is an exemplary and schematic side view of a semiconductor optical device according to a fourth embodiment.

FIG. 9 is a side view of a semiconductor optical device 100D according to a fourth embodiment. As illustrated in FIG. 9, the height of the core layer 11b in the Z direction is even higher in this embodiment, so that the depth of the marker 30 in the Z direction is also deeper. In such a configuration, the central axis Axc of the core layer 11b is offset in the direction opposite to the Z direction with respect to the central axis Axl of the active layer 22 of the light-emitting element 20 that is placed on the facets 12a of the second protrusions 12. In other words, by forming the markers 30, the second protrusions 12, and the core layer 11b in such a manner that these axes are offset from each other, it is possible to increase the depth of the markers 30 with respect to the facet 12a. Such an increased depth has an advantage that, for example, it is possible to form the markers 30 more reliably, to improve the visibility of the markers, and to enable a camera to better identify the markers 30.

Fifth Embodiment

Figure 10:
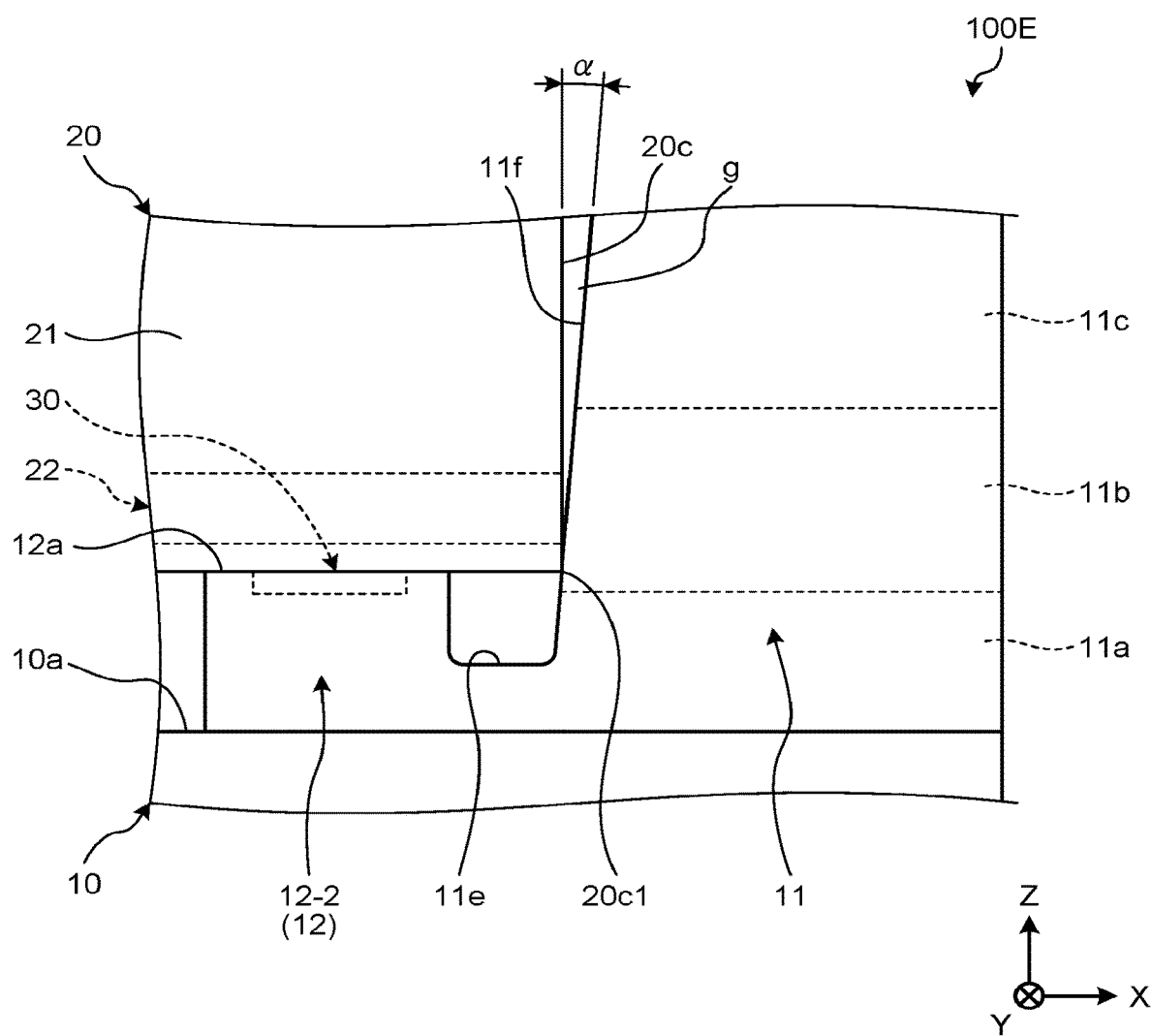
FIG. 10 is an exemplary and schematic side view of a part of a semiconductor optical device according to a fifth embodiment.

FIG. 10 is a side view of a part of a semiconductor optical device 100E according to a fifth embodiment. As illustrated in FIG. 10, in this embodiment, the facet 20c of the light-emitting element 20 in the X direction is in abutment against a facet 11f of the first protrusion 11 in the direction opposite to the X direction, and the light-emitting element 20 is positioned in the X direction by this abutment. This configuration allows the light-emitting element 20 to be positioned in the X direction more easily.

In the same manner as in the first embodiment, a recess 11e is provided between the first protrusion 11 and the second protrusion 12-2, in a manner recessed in the direction opposite to the Z direction. An end of the facet 11f may delineate a curved recessed surface (has an R-shape corner), the facet being that on the side opposite to the Z direction. Such a curved recessed surface tends to be susceptible to variations among units, so, if the facet 20c is in abutment against such a curved recessed surface in a configuration in which the facet 20c is in abutment against the facet 11f, the curved recessed surface could become a cause of variations in the position of the light-emitting element 20 in the X direction, among the units. In this respect, by providing the concave portion 11e, it is possible to displace the curved recessed surface provided on an end of the facet 11f in the direction opposite to the Z direction, with respect to the light-emitting element 20 in the direction opposite to the Z direction. Therefore, this embodiment exerts an advantage that, for example, it is possible to avoid variations in the positions of the light-emitting element 20 in the X direction, variations being those among the units, due to the abutment between the facet 20c and the recessed surface.

The facet 11f of the first protrusion 11 is inclined at an angle α with respect to the Z direction in a manner moving toward the X direction as the first protrusion 11 extends in the Z direction, and a corner 20c1 of the facet 20c of the light-emitting element 20, which is positioned at an end in the direction opposite to the Z direction, is in contact with the facet 11f. Because the active layer 22 of the light-emitting element 20 is more brittle than the cladding layer 21 or the like, in a configuration in which the light-emitting element 20 is in abutment against the first protrusion 11 in the X direction, it is undesirable for the active layer 22 to be brought into contact with the first protrusion 11. In this respect, in this embodiment, because the facet 11f is inclined toward the X direction as the facet extends toward the Z direction, the corner 20c1 of the facet 20c of the light-emitting element 20 is brought into abutment against the facet 11f, the corner 20c1 being displaced with respect to the active layer 22 in the direction opposite to the Z direction, and a gap g is formed between the active layer 22 and the facet 11f. The distance between the active layer 22 and the facet 11f is, for example, less than 1 [μm]. Thus, this embodiment exerts an advantage that, for example, it is possible to suppress a damage of the active layer 22 due to the abutment against the first protrusion 11. The facet 20c and the corner 20c1 of the light-emitting element 20 are examples of an end of the light-emitting element 20 in the X direction.

Sixth Embodiment

Figure 11:
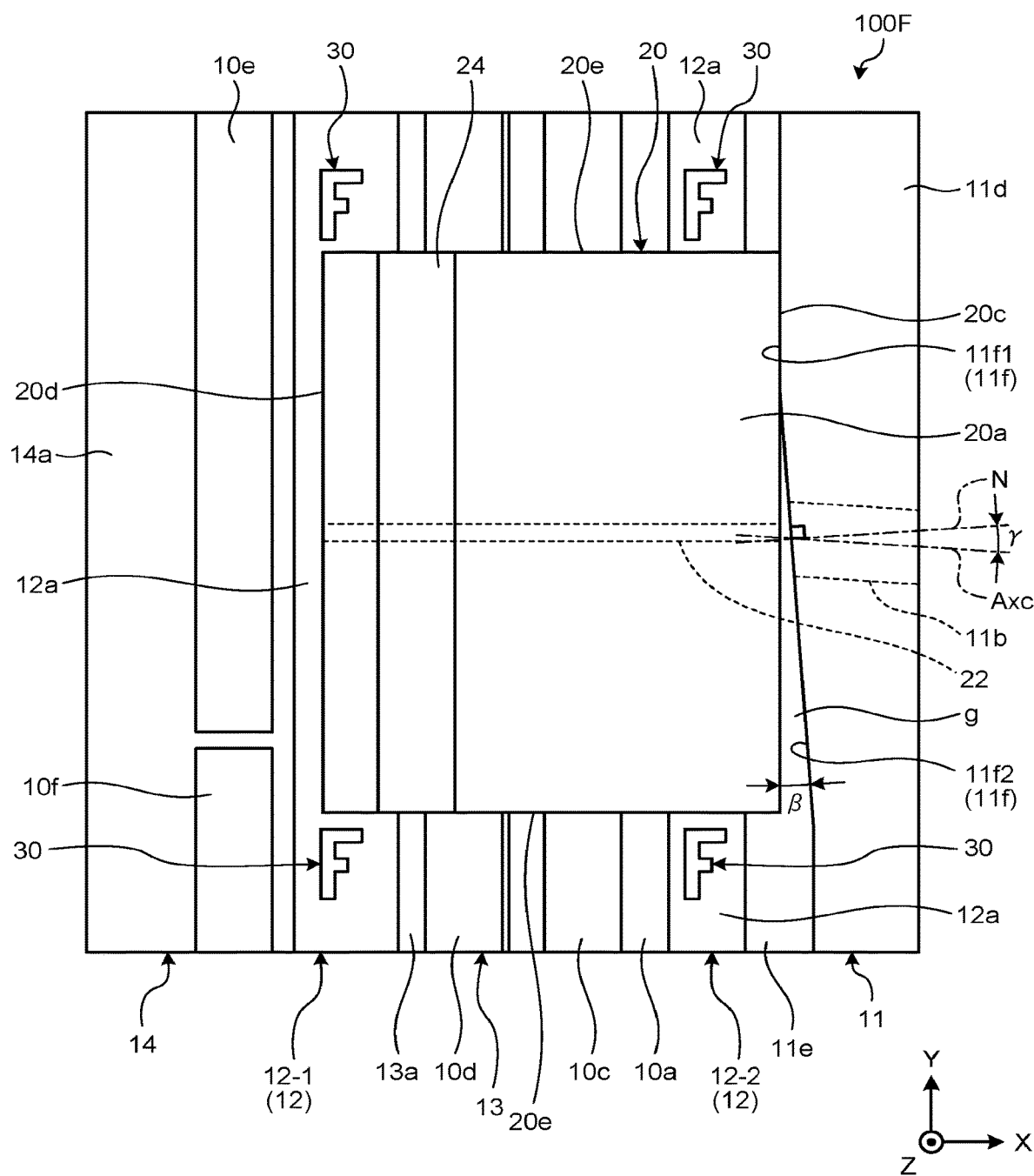
FIG. 11 is an exemplary and schematic plan view of a semiconductor optical device according to a sixth embodiment.

FIG. 11 is a plan view of a semiconductor optical device 100F according to a sixth embodiment. As illustrated in FIG. 11, in this embodiment, in the same manner as in the fifth embodiment described above, the facet 20c of the light-emitting element 20 in the X direction is in abutment against the facet 11f of the first protrusion 11 in the direction opposite to the X direction, and the light-emitting element 20 is positioned in the X direction by this abutment.

However, in this embodiment, the facet 11f of the first protrusion 11 has a first surface 11f1 and a second surface 11f2. The first surface 11f1 is positioned in a manner offset from the core layer 11b in the Y direction, and is abutment against the facet 20c of the light-emitting element 20. The second surface 11f2 is positioned adjacently to the first surface 11f1 in the direction opposite to the Y direction, and is inclined by an angle β with respect to the direction opposite to the Y direction so that the core layer 11b is exposed in the direction opposite to the X direction, with a gap g formed between the facet 20c and the core layer 11b. The second surface 11f2 becomes inclined toward the X direction as the second surface 11f2 extends toward the direction opposite to the Y direction. The angle β is equal to or more than 1 [deg] and equal to or less than 7 [deg], for example. This configuration also allows a gap g to be ensured between the active layer 22 and the first protrusion 11. Thus, this embodiment, too, has the advantage that, for example, it is possible to suppress damages of the active layer 22 due to the abutment against the first protrusion 11. The Y direction is an example of a third direction.

In this embodiment, a normal line N (normal direction) of the second surface 11f2 and the central axis Axc (optical axis direction) of the core layer 11b intersect each other diagonally at an angle γ. The angle γ is equal to or more than 5 [deg] and equal to or less than 11 [deg], for example. According to this embodiment, for example, it is possible to achieve an advantage that, because returned light propagating in the core layer 11b toward the light-emitting element 20 becomes reflected on the second surface 11f2, and propagates to and becomes scattered in directions not coupled to the core layer 11b, it is possible to suppress adverse effects of the returned light.

Seventh Embodiment

Figure 12:
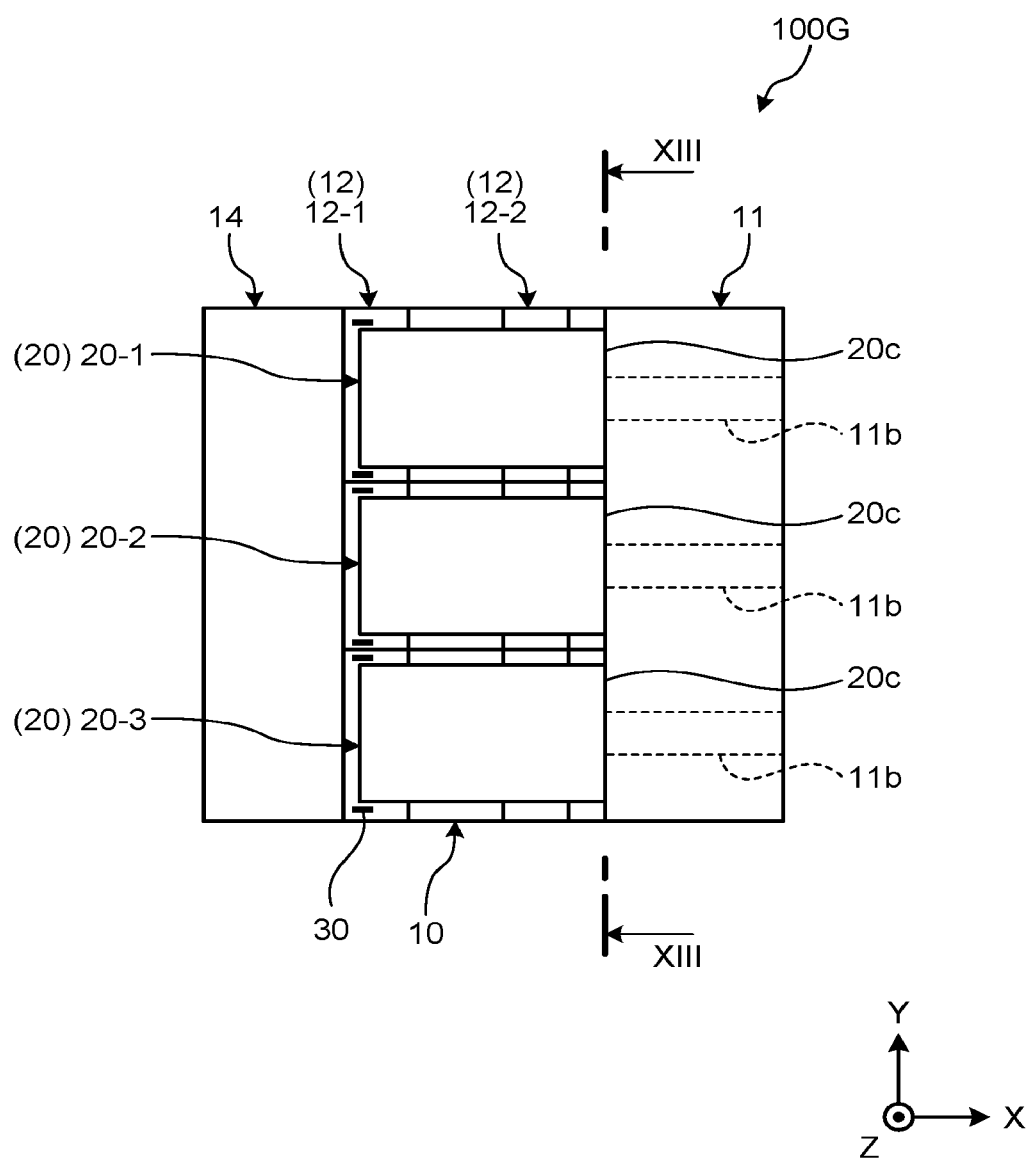
FIG. 12 is an exemplary and schematic plan view of a semiconductor optical device according to a seventh embodiment.
Figure 13:
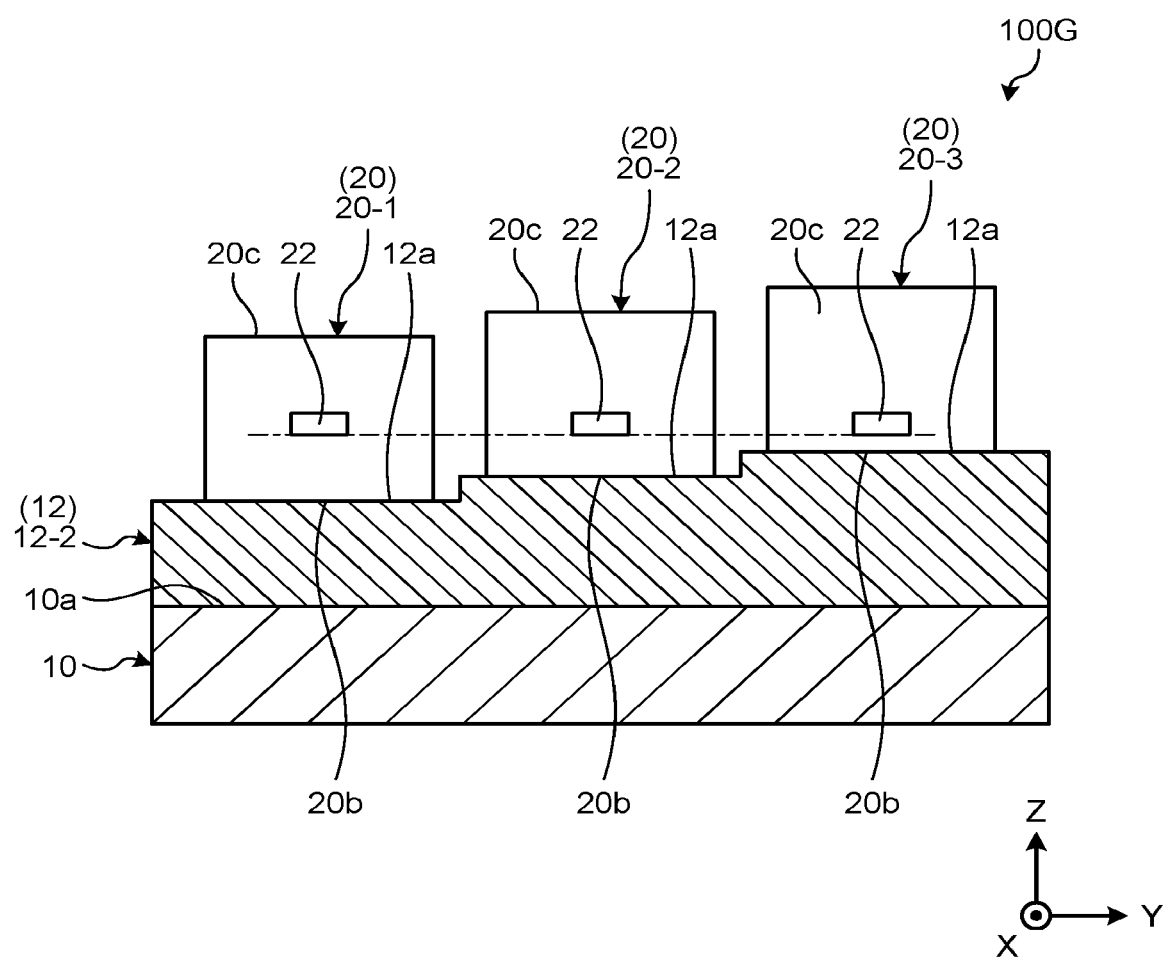
FIG. 13 is a sectional view across the line XIII-XIII in FIG. 12.

FIG. 12 is a plan view of a semiconductor optical device 100G according to a seventh embodiment, and FIG. 13 is a sectional view across the line XIII-XIII in FIG. 12.

As illustrated in FIGS. 12 and 13, in this embodiment, three light-emitting elements 20 that output laser beams at respective different wavelengths are provided.

The three light-emitting elements 20 are semiconductor laser elements, and are a red light source, a blue light source, and a green light source, for example. The red light source outputs visible red light at a wavelength within a range of 620 [nm] to 750 [nm] for example. The blue light source outputs visible blue light at a wavelength within a range of 450 [nm] to 495 [nm], for example. The green light source outputs visible green light within a range of 495 [nm] to 570 [nm], for example.

The three light-emitting elements 20 are arranged in the Y direction. As illustrated in FIG. 13, the facet 12a of the second protrusion 12-2 has a step-like shape moving toward the Z direction as the facet 12a extends toward the Y direction. In other words, the facet 12a on which a light-emitting element 20-2 is placed is offset in the Z direction from the facet 12a on which a light-emitting element 20-1 is placed, and the facet 12a on which a light-emitting element 20-3 is placed is offset in the Z direction from the facet 12a on which the light-emitting element 20-2 is placed. Accordingly, the facet 20b of the light-emitting element 20-2 is offset in the Z direction from the facet 20b of the light-emitting element 20-1, and the facet 20b of the light-emitting element 20-3 is offset in the Z direction from the facet 20b of the light-emitting element 20-2. The facet 20b is an example of a bottom surface placed on the facet 12a.

Furthermore, as illustrated in FIG. 13, in this embodiment, the distance between the facet 20b of the light-emitting element 20-2 and the active layer 22 in the Z direction is greater than the distance between the facet 20b of the light-emitting element 20-3 and the active layer 22 in the Z direction, and the distance between the facet 20b of the light-emitting element 20-1 and the active layer 22 in the Z direction is greater than the distance between the facet 20b of the light-emitting element 20-2 and the active layer 22 in the Z direction. In this configuration, the distances between the front surface 10a and the active layers 22 in the Z direction are approximately the same among the three light-emitting elements 20-1 to 20-3, as illustrated in FIG. 13.

As illustrated in FIG. 12, the first protrusion 11 is provided with three core layers 11b that correspond to the light-emitting elements 20-1 to 20-3 and to which the light beams output from the light-emitting elements 20-1 to 20-3 are coupled. In the configuration herein, as described above, the semiconductor optical device 100G according to this embodiment is configured in such a manner that the distances between the front surface 10a and the active layers 22 in the Z direction are approximately the same among the three light-emitting elements 20-1 to 20-3. Therefore, it is possible to keep the distance between the front surface 10a and the core layer 11b in the Z direction constant among the core layers 11b. Therefore, according to this embodiment, it is possible to reduce the labors and the cost for manufacturing the core layer 11b, such as the first protrusion 11, therefore, to reduce the labors and the cost for manufacturing the semiconductor optical device 100G, advantageously, compared with a configuration in which a plurality of core layers 11b are provided at different distances from the front surface 10a in the Z direction, for example.

Eighth Embodiment

Figure 14:
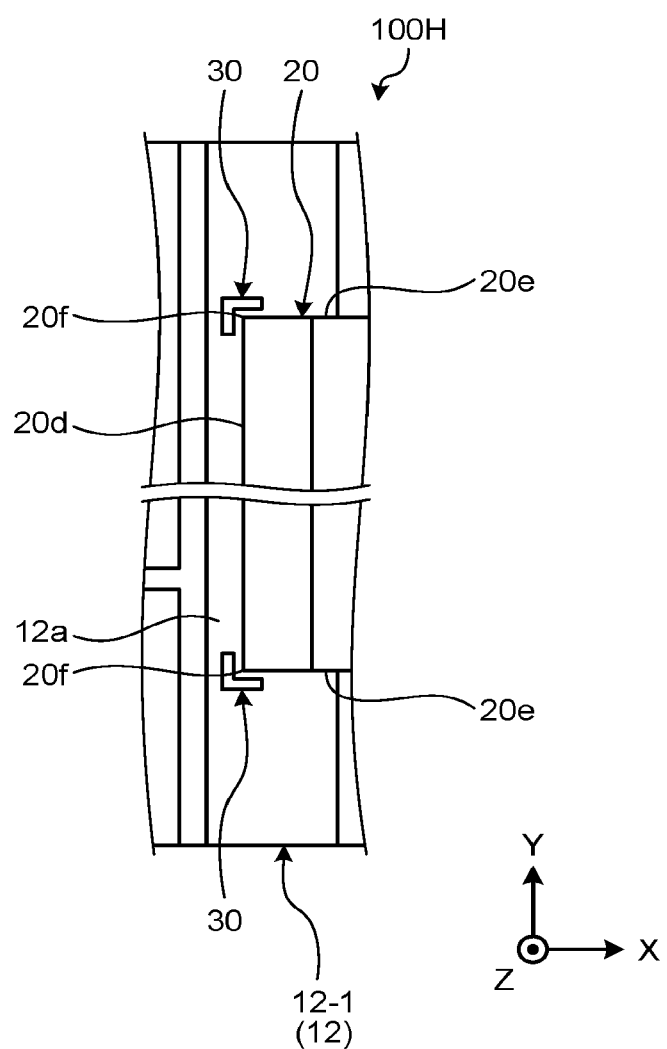
FIG. 14 is an exemplary and schematic plan view of a part of a semiconductor optical device according to an eighth embodiment.

FIG. 14 is a plan view of a semiconductor optical device 100H according to an eighth embodiment. As illustrated in FIG. 14, in this embodiment, the markers 30 are provided next to the respective corners 20f of the light-emitting element 20, with a gap therebetween, in a view in the direction opposite to the Z direction. Each of the markers 30 is L-shaped, and has a portion facing the facet 20d with a gap therebetween in the X direction, and a portion facing the facet 20e with a gap therebetween in the Y direction. This embodiment provides an advantage that the markers 30 may be used for positioning the light-emitting element 20 in both of the X direction and the Y direction, for example. The markers 30 according to this embodiment are an example of a third marker.

Ninth Embodiment

Figure 15:
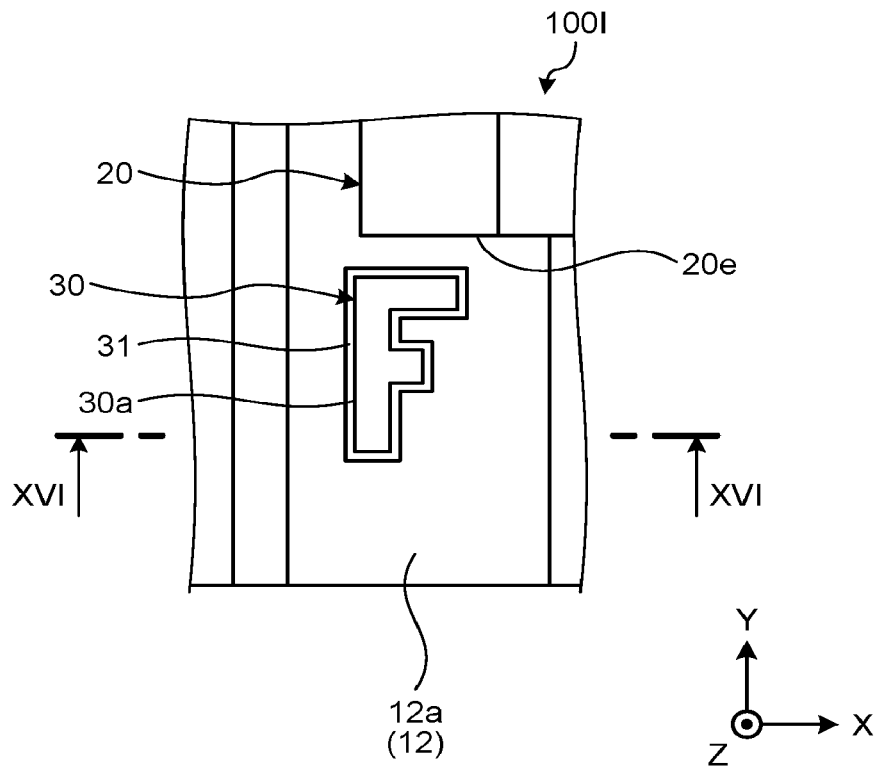
FIG. 15 is an exemplary and schematic plan view of a part of a semiconductor optical device according to a ninth embodiment.
Figure 16:
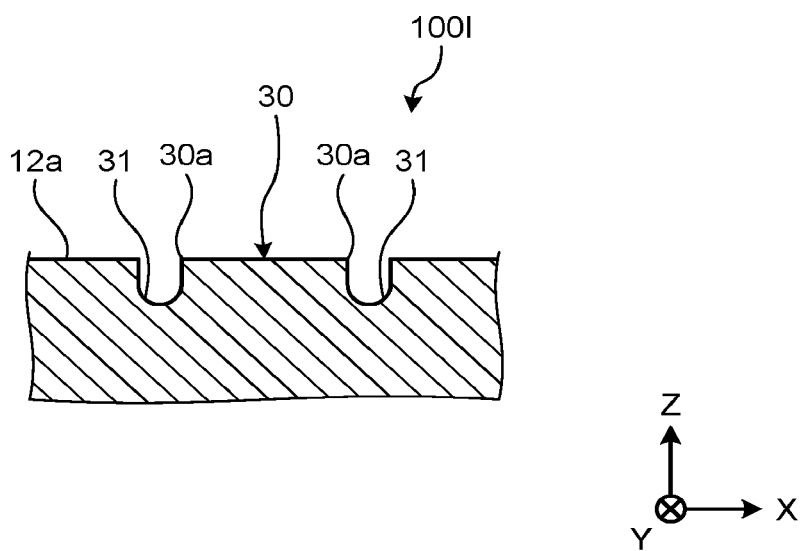
FIG. 16 is a sectional view across the line XVI-XVI in FIG. 15.

FIG. 15 is a plan view of a part of a semiconductor optical device 100I according to a ninth embodiment, and FIG. 16 is a sectional view across the line XVI-XVI in FIG. 15. As illustrated in FIGS. 15 and 16, in this embodiment, each of the markers has a recessed groove 31, recessed at a constant width, along the periphery of the marker 30. This forms a corner along a periphery 30a of the marker 30. According to this embodiment, for example, because the corner is formed along the periphery 30a of the marker 30, a worker may better recognize the marker 30 visually, or the markers 30 may be better identified in image processing applied to an image captured by a camera, when the worker or the robot places the light-emitting element 20 on the facet 12a, advantageously, compared with a configuration in which no recessed groove 31 is provided, and there is no corner around the periphery 30a.

According to the present disclosure, for example, it is possible to achieve a semiconductor optical device having an improved and novel configuration, and a method of manufacturing such a semiconductor optical device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor optical device comprising:
    a base configured to intersect with a first direction;
    a first protrusion configured to protrude from the base in the first direction, the first protrusion including a planar lightwave circuit including: a core layer; and a cladding layer surrounding the core layer;
    two second protrusions each configured to protrude from the base in the first direction and arranged along the first protrusion in a second direction intersecting with the first direction, a height of each second protrusion from the base in the first direction being lower than a height of the first protrusion;
    an optical semiconductor element placed on a facet of the second protrusion in the first direction and optically connected to the core layer;
    a marker provided on the second protrusion in a manner exposed on the facet of the second protrusion, the marker being made of a same material as the core layer;
    a first electrode provided to a facet of the optical semiconductor element in a direction opposite to the first direction, the first electrode positioned between the two second protrusions;
    a conductor positioned between the two second protrusions and electrically connected to the first electrode, wherein the conductor is a conductive paste,
    a rough surface configured to contact the conductive paste and having a greater surface roughness than a remaining part, the rough surface being provided at a position between the two second protrusions on the facet of the base in the first direction;
    a third protrusion configured to protrude from a position between the two second protrusions of the base in the first direction, a height of the third protrusion from the base in the first direction being lower than heights of the two second protrusions; and
    a third electrode provided on a facet of the third protrusion in the first direction and electrically connected to the conductor.

2. The semiconductor optical device according to claim 1, wherein a first height from the base to the core layer in the first direction, and a second height from the base to the marker in the first direction, are identical.

3. The semiconductor optical device according to claim 1, further comprising a first marker positioned adjacently to an edge of the optical semiconductor element, with a gap between the first marker and the edge of the optical semiconductor element, in a view in a direction opposite to the first direction.

4. The semiconductor optical device according to claim 1, wherein the marker comprises two second markers and the optical semiconductor element is positioned between the two second markers in a view in a direction opposite to the first direction.

5. The semiconductor optical device according to claim 1, wherein
the optical semiconductor element has a rectangular shape in a view in a direction opposite to the first direction, and
the semiconductor optical device further comprises a third marker positioned adjacently to a corner of the optical semiconductor element in a view in the direction opposite to the first direction.

6. The semiconductor optical device according to claim 1, further comprising a second electrode provided at a position between the two second protrusions on the facet of the base in the first direction and electrically connected to the conductor.

7. The semiconductor optical device according to claim 1, wherein
the two second protrusions are separated from each other in the second direction, and
one of the two second protrusions which is positioned farther away from the first protrusion is integrated with the third protrusion.

8. The semiconductor optical device according to claim 1, further comprising a fourth protrusion configured to protrude from the base in the first direction on an opposite side of the third protrusion with respect to the second protrusion integrated with the third protrusion, and a height of the fourth protrusion from the base in the first direction is higher than the heights of the two second protrusions, wherein
a fourth electrode electrically connected to the third electrode is provided on a facet of the fourth protrusion in the first direction.

9. The semiconductor optical device according to claim 1, wherein a central axis of the core layer is offset from a central axis of an active layer of the optical semiconductor element in a direction opposite to the first direction.

10. The semiconductor optical device according to claim 1, wherein an end of the optical semiconductor element in the second direction is in abutment against a facet of the first protrusion in the direction opposite to the second direction.

11. The semiconductor optical device according to claim 10, wherein a facet of the first protrusion in a direction opposite to the second direction is inclined further toward the second direction as the facet extends toward the first direction, and is in abutment against an end of the optical semiconductor element in the second direction.

12. The semiconductor optical device according to claim 10, wherein a recess that is recessed in a direction opposite to the first direction is provided between the first protrusion and the second protrusion.

13. The semiconductor optical device according to claim 10, wherein a facet of the first protrusion in the direction opposite to the second direction includes:
a first surface that is offset from the core layer in a third direction intersecting with the first direction and the second direction and is in abutment against an end of the optical semiconductor element in the second direction; and
a second surface positioned adjacently to the first surface in a direction opposite to the third direction and on which the core layer is exposed in a direction opposite to the second direction, with a gap with respect to an end of the semiconductor optical device in the second direction, the second surface being inclined with respect to the first surface in a manner inclined in the second direction as the second surface extends in a direction opposite to the third direction.

14. The semiconductor optical device according to claim 13, wherein a normal direction of the second surface and an optical axis direction of the core layer intersect with each other diagonally.

* * * * *